May 19, 1970   M. FRESARD   3,512,429
VARIABLE RESISTANCE CONTROL DEVICE FOR REGULATING
THE SPEED OF AN ELECTRIC MOTOR
Filed Jan. 19, 1968

INVENTOR
MARCEL FRESARD

BY  *Emory L. Groff Jr.*

ATTORNEY

United States Patent Office 3,512,429
Patented May 19, 1970

3,512,429
VARIABLE RESISTANCE CONTROL DEVICE FOR REGULATING THE SPEED OF AN ELECTRIC MOTOR
Marcel Fresard, Petit-Lancy, Geneva, Switzerland, assignor to Mefina S.A., Fribourg, Switzerland, a corporation of Switzerland
Filed Jan. 19, 1968, Ser. No. 699,124
Claims priority, application Switzerland, Feb. 13, 1967, 2,089/67
Int. Cl. H01c 5/06; H01n 3/12; G05g 1/00
U.S. Cl. 74—503                    6 Claims

ABSTRACT OF THE DISCLOSURE

A variable resistance control device for regulating the speed of an electric motor has a control member such as a foot-operated, spring-restored, depressible pushbutton whose downward travel is proportional to the speed of the motor. The maximum travel of the pushbutton and hence the maximum speed of the motor, is adjustable to predetermined levels by means of a rod disposed axially within the pushbutton forming a stop-member and adjustable to a selected level by engagement of radial fins on the rod in notches of predetermined depths distributed angularly within the inner face of the pushbutton. The upper end of the rod has a slot which is accessible from the top of the button for adjustment of the position of the rod by a screwdriver or the like.

---

The present invention relates to a variable resistance control device for regulating the speed of an electric motor. More particularly it relates to such a device which comprises a control member the travel of which is adjustable selectively and is appreciably proportional to the speed of the motor.

In certain fields of technology and in particular in the field of sewing machines, it is sometimes desirable for the user of the machine to be able to adjust the highest driving speed for performing certain work to a lower level than that rated by the sewing machine, this lower level being dependent upon the particular sewing operation to be effected.

The primary object of the present invention is to provide a device for regulating the speed of an electric motor in such manner.

According to the invention, a variable resistance control device for regulating the speed of an electric motor, comprises a control member the travel of which is adjustable selectively and is appreciably proportional to the speed of the motor, said control member comprising an adjustable stop device enabling the extent of the travel of the control member to be limited so as to select the maximum speed of the motor.

In order that the invention may be more fully understood, a preferred embodiment of the control device according to the invention is described below purely by way of example, with reference to the accompanying drawing in which.

Figure 1:
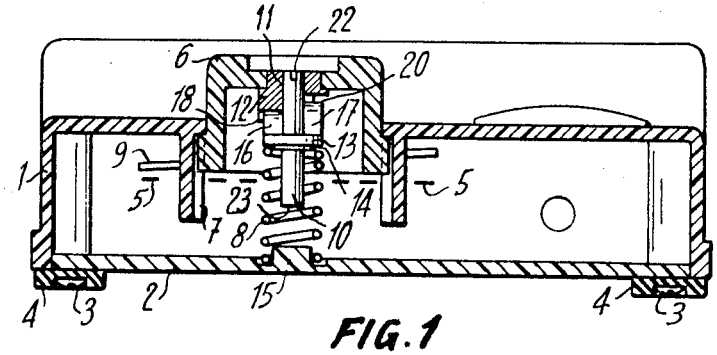
FIG. 1 shows diagrammatically a sectional view of one embodiment of a control device according to the invention, said section being taken along line I—I of FIG. 2.

With reference to the drawing, the control device shown is a device of the type used for controlling the operating speed particularly of a sewing machine.

Such a device is intended to be controlled by means of the foot of the operator. This control device comprises a casing 1 closed by a removable base 2 attached to the casing by means of screws 3.

The screws 3 are also used for attaching rubber buffers 4 to the base of the casing 1. In the casing 1 there is arranged a resistance element provided with several intermediate contact studs or strips 5 enabling one or several partial resistances to be placed out of circuit, making the total resistance of this device variable. The placing out of circuit of one or several resistances in the supply circuit of the electric motor is accomplished, in the example shown, by means of a pushbutton 6 capable of sliding vertically in slide 7 forming part of the casing 1. A spring 8 of the helical type returns the pushbutton 6 to its initial position. On one of its sides, the pushbutton 6 is rigidly fixed to a plate 9 which is a good conductor of electricity and is disposed at an oblique angle on the body of the button 6, so that proportionate to the depression of the latter, the plate 9 comes into successive contact with the various strips 5 for placing out of circuit the successive resistance elements. The travel of the control member 6 is therefore selectively adjustable and is appreciably proportional to the speed of the electric motor driven by the control device.

The variable resistance control device includes an adjustable stop device enabling the extent of travel of the control member 6 to selectively limit the maximum speed of the electric motor. This adjustable stop device comprises a rod 10 disposed axially of the button 6 and whose upper end passes through an opening 11 in the central part 12 of the button 6.

Figure 2:
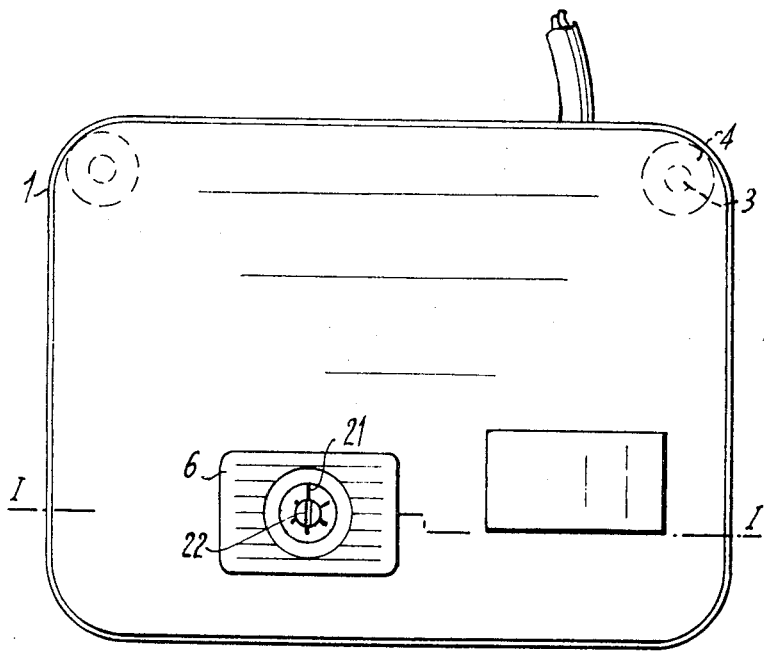
FIG. 2 shows a plan view of the device.
Figure 3:
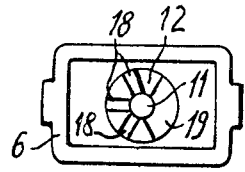
FIG. 3 shows a detail view of the inner face of the pushbutton according to the invention.

In the embodiment shown, the rod 10 has a flange 13 providing a shoulder 14 against which the upper end of a spring 8 abuts. The lower end of the spring 8 is engaged around a guide stud 15 provided on the base 2. The rod 10 has two radial projections 16, 17 respectively intended to cooperate successively with one of several notches 18 of various depths arranged in the central part 12 of the button 6. These notches 18 are distributed angularly around the opening through which the rod 10 passes. FIG. 3 shows the inner face of the pushbutton 6, whose central part 12 has a channeled part 19 allowing full freedom of displacement to one of the projections 16, 17 respectively, although the other of said two radial projections is engaged in one of the notches 18. As is shown in FIG. 1, the axial stop surface 20 of each of the projections 16, 17 respectively is in a different axial position. In the arrangement shown in the drawing, it is seen that by means of the two radial projections 16 and 17 and three notches 18 of different depths, there may be obtained six different axial positions of the rod 10 with respect to the pushbutton 6, which provides six different maximum degrees or stages of depression of the pushbutton 6, for which there are six different maximum speeds for rotatably driving the electric motor. As is shown in FIG. 2, these six different degrees of depression are indicated on the pushbutton 6 by means of a scale 21. Means are provided to enable the rod 10 to be rotated. In the embodiment shown, these means are provided by the slot 22 enabling engagement of the end of a blade of a screwdriver or the like in the upper end of the rod 10 to enable the latter to be rotated after being urged axially against the action of the spring 8. The return spring 8 of the pushbutton 6 ensures at the same time the stable maintenance of projections 16, 17 respectively, in the selected notch 18.

The operation of the adjustable stop device described above is accomplished in the following manner:

Upon depression of the pushbutton 6 by the operator's foot, when the pushbutton 6 arrives at the end of its downward movement, the lower end 23 of the rod 10 comes into contact with the stud or boss 15 and thus prevents any continuation of the downward travel of the button 6.

Numerous modifications of the disclosed adjustable stop device are possible. Thus, instead of placing the stop device on the interior of the pushbutton 6, the latter could be located on the exterior of the button 6 and be controlled, for example, from one of the side faces of the casing 1. Such an adjustable stop device, could comprise a cam or an eccentric fixed on an axis arranged transversely to the travel of the button 6 and actuated by an adjusting wheel or lever permitting, according to the angular position of the cam or of the eccentric, the button 6 being given a course of travel of predetermined maximum amplitude. It would suffice that cam or this eccentric is arranged on the trajectory of the inner edge of the pushbutton 6, for example. Other adjustable stop means such as adjusting screws or keys are also possible. These various means of construction of the adjustable stop device will vary furthermore, according to the type of control member whose travel must be selectively determined. It is clear that in the case of a control member 6 of the articulated pedal or oscillating type, the adjustable stop device selected could be different from that shown by way of example.

What I claim is:

1. A variable resistance control device for regulating the speed of an electric motor, comprising a pushbutton control member whose displacement is adjustable at the option of the user and is proportional to the speed of the motor, said control member including an adustable stop device enabling the extent of travel of the control member to be limited so as to selectively determine the maximum speed of the motor, a spring normally urging said pushbutton to its inoperative position, said stop device comprising a rod disposed axially of said pushbutton, a housing within said pushbutton for receiving said rod, a pluraliy of notches of various depths arranged in said button and distributed angularly around said housing, said rod having at least one radial projection cooperating successively with one of said notches, and means for rotating said rod to a selected position whereby said radial projection engages one of said notches the depth of which determines a given maximum speed of the motor.

2. A device according to claim 1, wherein one end of said rod is visible on the pushbutton and engagement means is provided on the end of said rod for receiving a tool permitting rotation thereof.

3. A device according to claim 1, wherein said rod includes a shoulder, said spring surrounding said rod and urging it against said shoulder so as to positively maintain said radial projection in a selected one of said notches and thereby set the axial position of said rod.

4. A device according to claim 1, wherein said rod has two radial projections in different axial positions cooperating successively with said plurality of notches according to the degree of rotation imparted to said rod.

5. A device according to claim 2, wherein said rod has two radial projections in different axial positions cooperating successively with said plurality of notches according to the degree of rotation imparted to said rod.

6. A devicve according to claim 3, wherein said rod has two radial projections in different axial positions cooperating successively with said plurality of notches according to the degree of rotation imparted to said rod.

References Cited

UNITED STATES PATENTS

| 1,477,375 | 12/1923 | Maudslay | 338—215 |
| 2,333,814 | 11/1943 | Penkins | 338—198 XR |
| 2,469,924 | 5/1949 | Kunz | 338—198 XR |
| 2,472,604 | 6/1949 | McDonald | 338—198 |
| 2,512,880 | 6/1950 | Russell | 338—215 XR |
| 2,520,732 | 8/1950 | McDonald | 338—215 XR |

THOMAS J. KOZMA, Primary Examiner

U.S. Cl. C.R.

200—11, 172; 338—191, 200